(12) United States Patent
Liour

(10) Patent No.: US 8,141,476 B2
(45) Date of Patent: Mar. 27, 2012

(54) DURABLE PISTON AND A RING UNIT FOR THE DURABLE PISTON

(76) Inventor: Jehn-Feng Liour, Kaohsiung Hsien (TW)

(*) Notice: Subject to any disclaimer, the term of this patent is extended or adjusted under 35 U.S.C. 154(b) by 980 days.

(21) Appl. No.: 12/124,987

(22) Filed: May 21, 2008

(65) Prior Publication Data

US 2009/0289421 A1 Nov. 26, 2009

(51) Int. Cl.
F16J 1/04 (2006.01)
(52) U.S. Cl. ......................................................... 92/212
(58) Field of Classification Search .................... 92/212, 92/248, 249; 277/451
See application file for complete search history.

(56) References Cited

U.S. PATENT DOCUMENTS

| | | | | |
|---|---|---|---|---|
| 3,942,808 A | * | 3/1976 | Gross | 277/446 |
| 4,962,691 A | * | 10/1990 | Kanao | 277/445 |
| 5,392,692 A | * | 2/1995 | Rao et al. | 92/246 |
| 6,428,014 B2 | * | 8/2002 | Scarlett | 277/435 |
| 2001/0045703 A1 | * | 11/2001 | Scarlett | 277/459 |

* cited by examiner

*Primary Examiner* — Michael Leslie
(74) *Attorney, Agent, or Firm* — Hershkovitz & Associates, LLC; Abraham Hershkovitz

(57) ABSTRACT

A durable piston is applied in a cylinder of an engine to output internal exploding power and has a piston head and a durable ring unit. The piston head is mounted in the cylinder of the engine, is driven for outputting kinetic energy and has a ring unit mount. The durable ring unit is mounted around the ring unit mount and has a distal ring and a proximal ring. The rings are mounted around the ring unit mount. An inner edge of the distal ring and the proximal ring are separated from the piston head of the piston so forming a first airway and a second airway. When the engine operates, high-pressure air fills the airways and presses the rings against the cylinder. Consequently, the airways maintain contact between the durable ring unit and the cylinder tight to prevent air leakage.

6 Claims, 7 Drawing Sheets

US 8,141,476 B2

DURABLE PISTON AND A RING UNIT FOR THE DURABLE PISTON

BACKGROUND OF THE INVENTION

1. Field of the Invention

The present invention relates to a durable piston and its ring unit, and more particularly to a piston being applied in an internal combustion engine to output internal exploding power.

2. Description of the Prior Arts

With reference to FIG. 10, a conventional piston (50) is applied in an internal combustion engine to output internal exploding power generated by burning fuel such as gas, diesel, petrol, ethanol or the like in a cylinder (60) of the engine.

The piston (50) is mounted slidably in the cylinder (60), is adjacent to a fuel chamber (61) of the cylinder (60), is driven to output kinetic energy when the fuel is burned in the fuel chamber (61) and has an annular wall, multiple annular grooves (51, 52) and multiple piston rings (54, 55).

The annular wall of the piston (50) corresponds to an inner wall of the cylinder (60).

The annular grooves (51, 52) are formed around the annular wall of the piston (50).

The piston rings (54, 55) are respectively mounted in the annular grooves (51, 52) and abut the inner wall of the cylinder (60) to seal the fuel chamber (61) and prevent air in the fuel chamber (61) from leaking.

However, after operating for a long time, friction generated between the piston rings (54, 55) and the inner wall of the cylinder (60) wears the piston rings (54, 55) or the inner wall of the cylinder (60) and cause leakage of air from the fuel chamber (61), which prevents complete combustion in the fuel chamber (61). Incomplete combustion not only decreases outputted power of the engine, but also pollutes the environment.

To overcome the shortcomings, the present invention provides a durable piston to mitigate or obviate the aforementioned problems.

SUMMARY OF THE INVENTION

The primary objective of the present invention is to provide a durable piston to prevent air in a cylinder of the engine from leaking out after being used for a long time.

The durable piston is applied in the cylinder of the engine to output internal exploding power and comprises a piston head and a durable ring unit. The piston head is mounted in the cylinder of the engine, is driven for outputting kinetic energy and has a ring unit mount. The durable ring unit is mounted around the ring unit mount and has a distal ring and a proximal ring. The rings are mounted around the ring unit mount. An inner edge of the distal ring and the proximal ring are separated from the piston head of the piston so forming a first airway and a second airway. When the engine operates, high-pressure air fills the airways and presses the rings against the cylinder. Consequently, the airways maintain contact between the durable ring unit and the cylinder tight to prevent air leakage.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
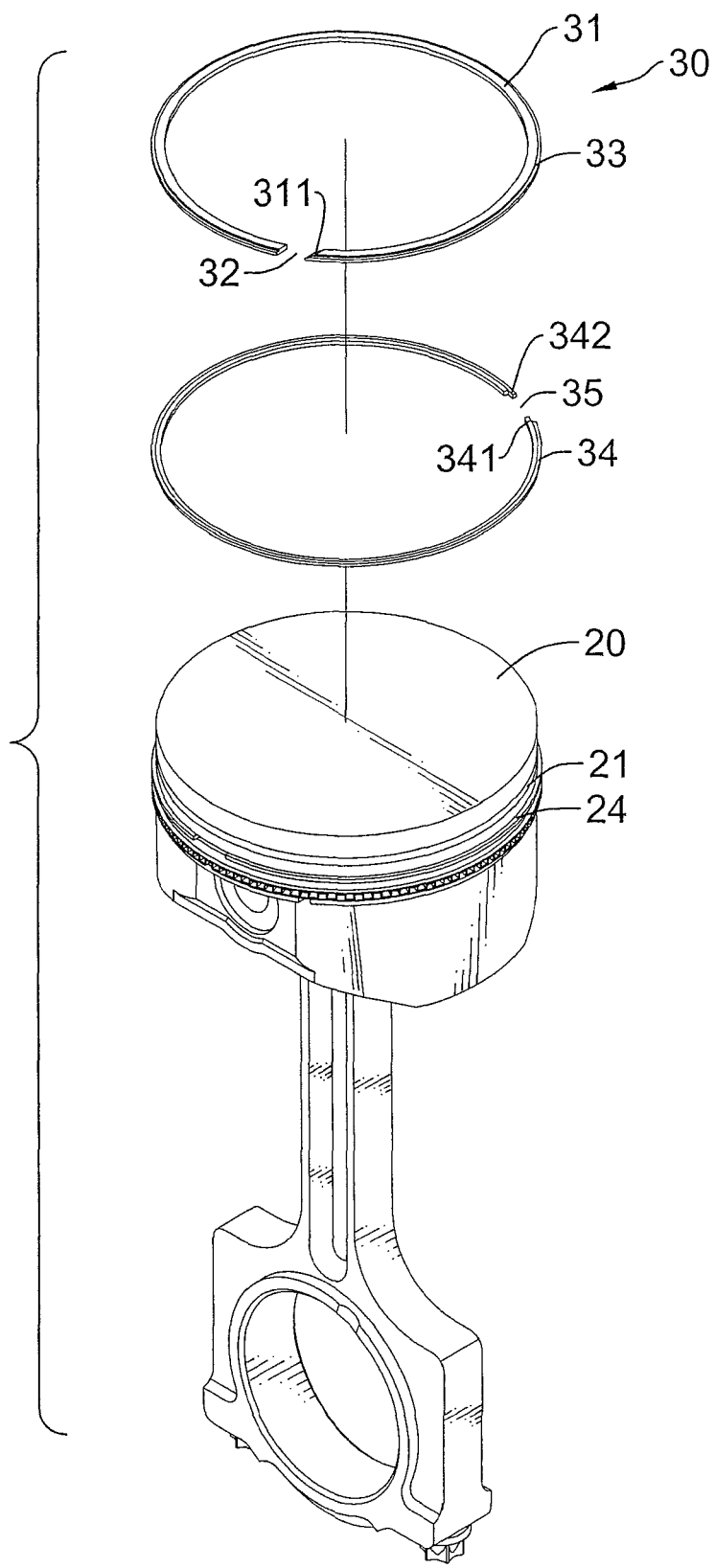
FIG. 1 is a partially exploded perspective view of a durable piston in accordance with the present invention.
Figure 3:
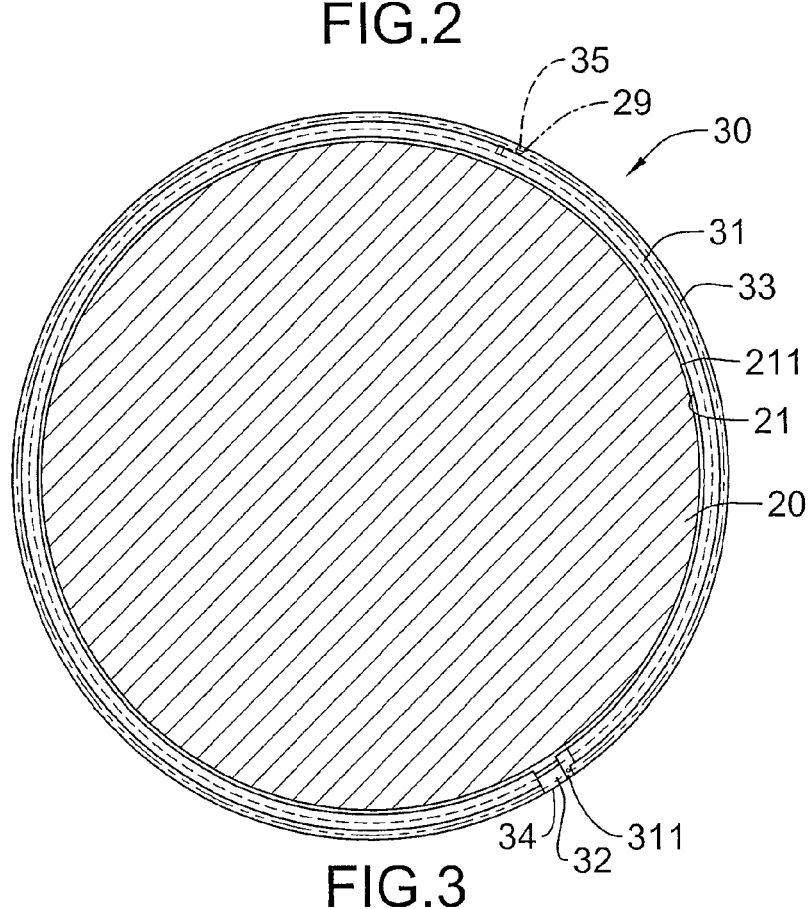
FIG. 3 is a cross-sectional top view of the durable piston in FIG. 1.

With reference to FIGS. 1 and 3, a durable piston in accordance with the present invention is applied in a cylinder (40) of an engine to output internal exploding power of the engine. The durable piston comprises a piston head (20), a durable ring unit (30) and at least one optional piston ring (24).

The piston head (20) is mounted slidably in the cylinder (40) of the engine, is adjacent to a fuel chamber (41) of the cylinder (40), is driven to output kinetic energy when fuel is ignited in the fuel chamber (41) and has an annular wall and a ring unit mount (21).

The annular wall of the piston head (20) corresponds to an inner wall of the cylinder (40).

Figure 2:
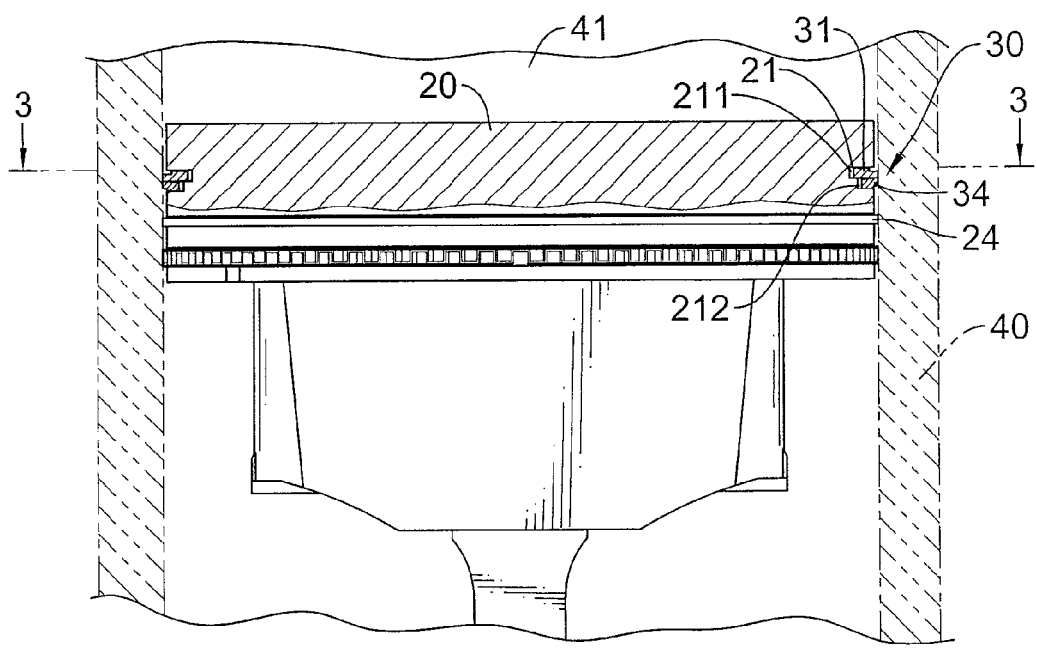
FIG. 2 is a side view in partial section of the durable piston in FIG. 1 being applied in a cylinder.
Figure 4:
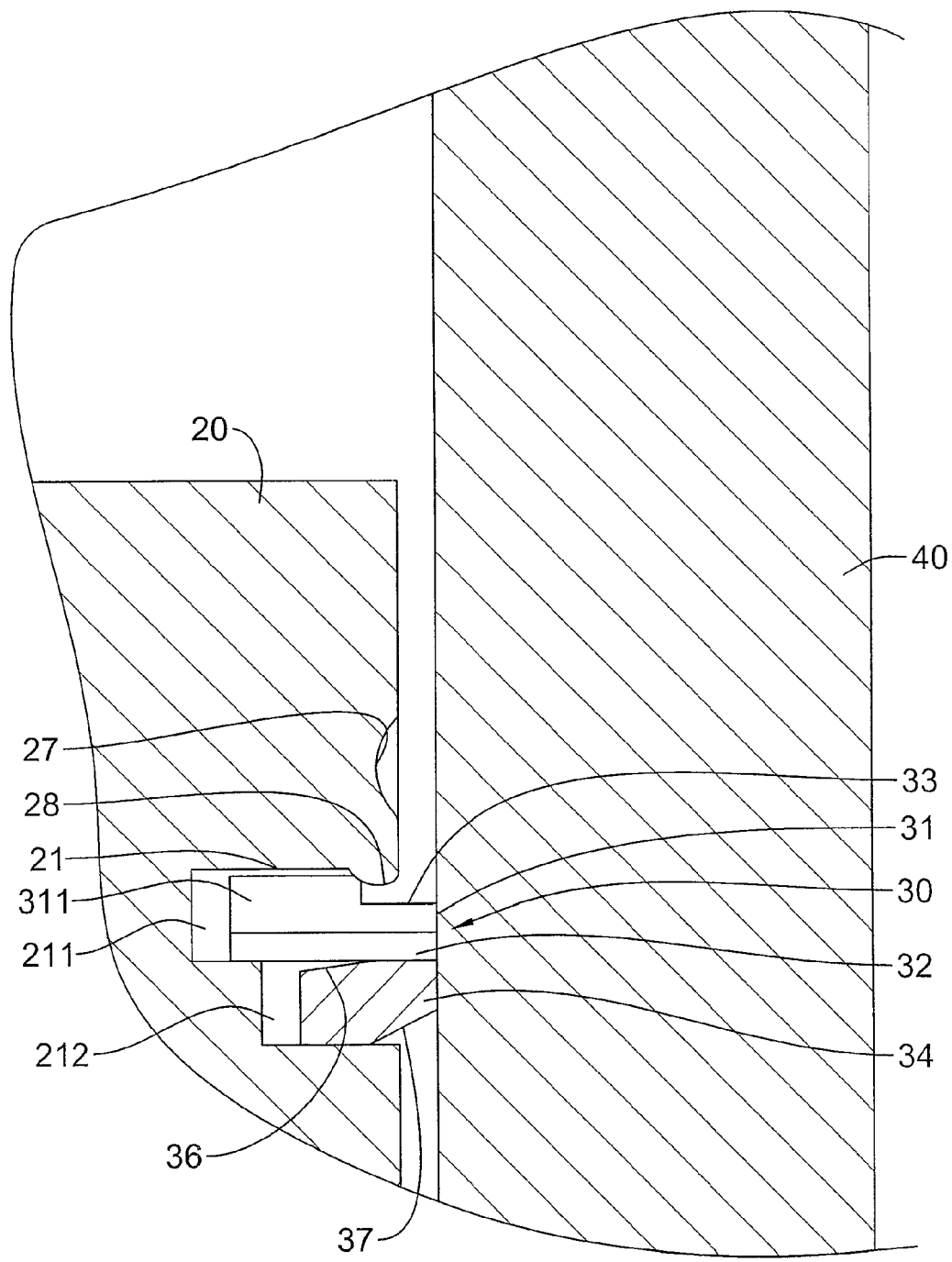
FIG. 4 is an enlarged cross-sectional side view of the durable piston in FIG. 1.
Figure 8:
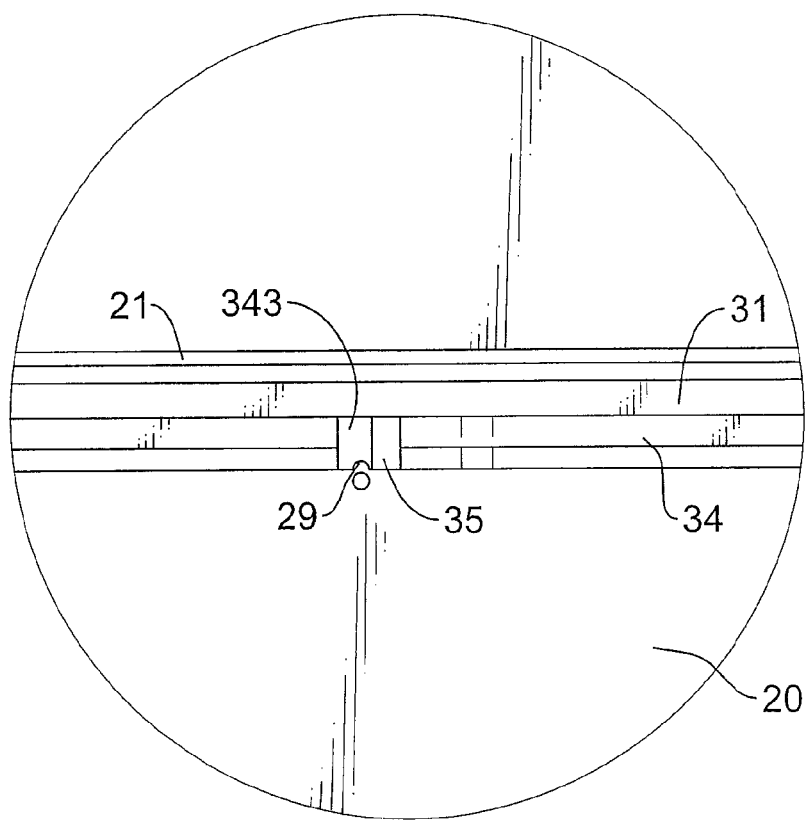
FIG. 8 is an enlarged front view of the durable piston in FIG. 1.

With further reference to FIGS. 2, 4 and 8, the ring unit mount (21) is annular, is formed around the annular wall of the piston head (20) and has a distal edge, a proximal edge, a distal ring groove (211), a proximal ring groove (212), an optional distal positioning protrusion (28) and an optional proximal positioning protrusion (29).

The distal ring groove (211) is formed transversely in and around the ring unit mount (21) adjacent to the distal edge of the ring unit mount (21) and has an inner wall.

The proximal ring groove (212) is formed transversely in and around the ring unit mount (21) adjacent to the proximal edge of the ring unit mount (21), is adjacent to and is shallower than the distal ring groove (211) and has an inner wall.

The distal positioning protrusion (28) is formed on and protrudes towards the distal ring groove (211) from the distal edge of the ring unit mount (21) and may be formed by punching the annular wall of the piston head (20). A recess (27) may be formed on the annular wall of the piston head (20) near the distal edge by being punched.

The proximal positioning protrusion (29) is formed on and protrudes towards the proximal ring groove (212) from the proximal edge of the ring unit mount (21) and is staggered relative to the distal positioning protrusion (28).

The durable ring unit (30) is mounted around the ring unit mount (21) to prevent air in the fuel chamber (41) from leaking and has a distal ring (31) and a proximal ring (34).

Figure 5:
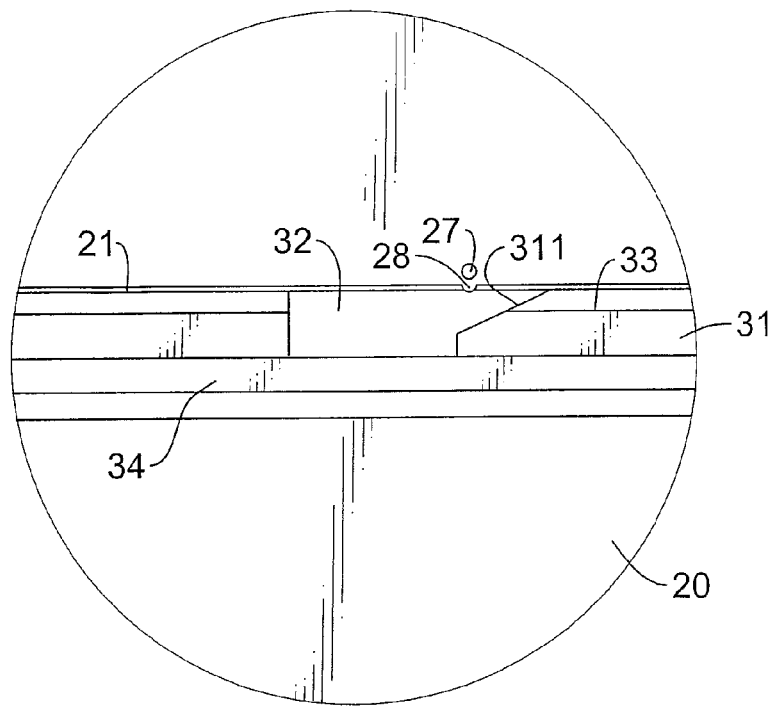
FIG. 5 is an enlarged front view of the durable piston in FIG. 1.
Figure 6:
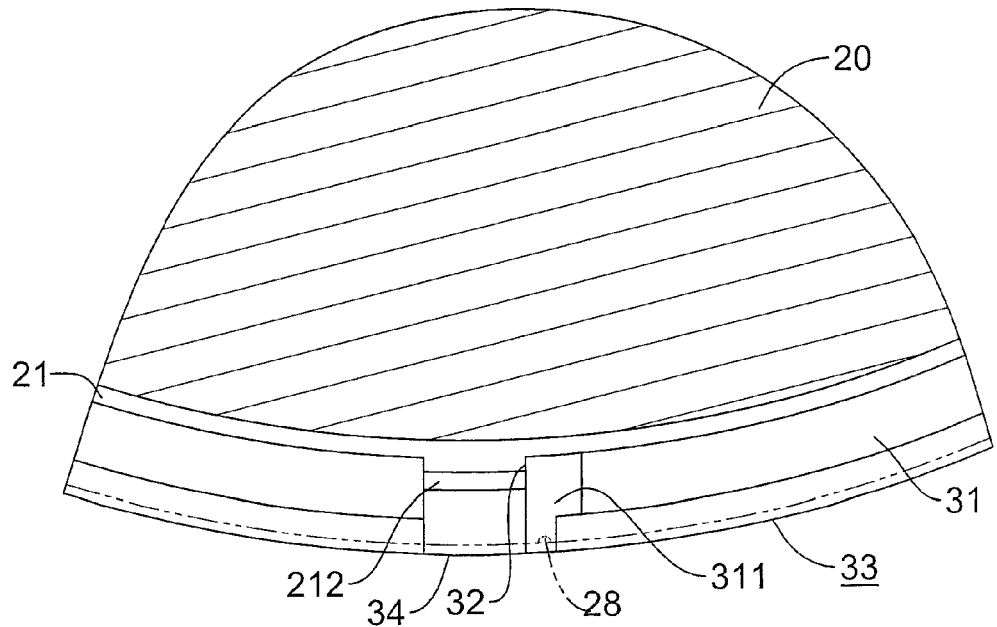
FIG. 6 is an enlarged cross-sectional top view of the durable piston in FIG. 1.

With further reference to FIGS. 5 and 6, the distal ring (31) is mounted around the distal ring groove (211) and has a proximal surface, an outer edge, an inner edge, a gap (32) and an optional shoulder (33).

The inner edge of the distal ring (31) is separated from the inner wall of the distal ring groove (211) so forms a first airway between the inner edge of the distal ring (31) and the inner wall of the distal ring groove (211).

The gap (32) is formed in the distal ring (31), may correspond to the distal positioning protrusion (28) and provides a space for thermal expansion and may prevent rotation and forms two separated ends of the distal ring (31).

One of the separated ends of the distal ring (31) may have an oblique portion (311). The oblique portion (311) of the end of the distal ring (31) has a longer proximal surface than distal surface and corresponds to the distal positioning protrusion (28) to prevent rotation of the distal ring (31).

The shoulder (33) is annular, is formed on and protrudes transversely from the outer edge of the distal ring (31) adjacent to the proximal surface and abuts the inner wall of the cylinder (40).

The proximal ring (34) is mounted around the proximal ring groove (212) and has an inner edge, an outer edge, a distal surface, a proximal surface and a gap (35).

The inner edge of the proximal ring (34) is separated from the inner wall of the proximal ring groove (212) so forming a second airway. The second airway is between the inner edge of the proximal ring (34) and the inner wall of the proximal ring groove (212) and communicates with the gap (32) of the distal ring (31).

The outer edge of the proximal ring (34) abuts the inner wall of the cylinder (40).

The distal surface of the proximal ring (34) abuts the proximal surface of the distal ring (31) and has an oblique portion (36). The oblique portion (36) of the distal surface of the proximal ring (34) is formed on the distal surface of the proximal ring (34) adjacent to the inner edge of the proximal ring (34) and is angled inward, toward the proximal edge of ring unit mount (21) from the outer edge toward the inner edge to reduce contact between the distal and proximal rings (31, 34) to allow the rings (31, 34) to expand without sticking together due to heat.

The proximal surface of the proximal ring (34) has an oblique portion (37). The oblique portion (37) of the proximal surface of the proximal ring (34) is formed on the proximal surface adjacent to the outer edge of the proximal ring (34) and is angled toward the distal surface of the proximal ring (34) from the inner edge toward the outer edge to reduce contact between the outer edge of the proximal ring (34) and the inner wall of the cylinder (40).

The gap (35) is formed in the proximal ring (34), may correspond to the proximal positioning protrusion (29) and providing a space for thermal expansion and forms overlapping first and second ends of the proximal ring (34).

Figure 7:
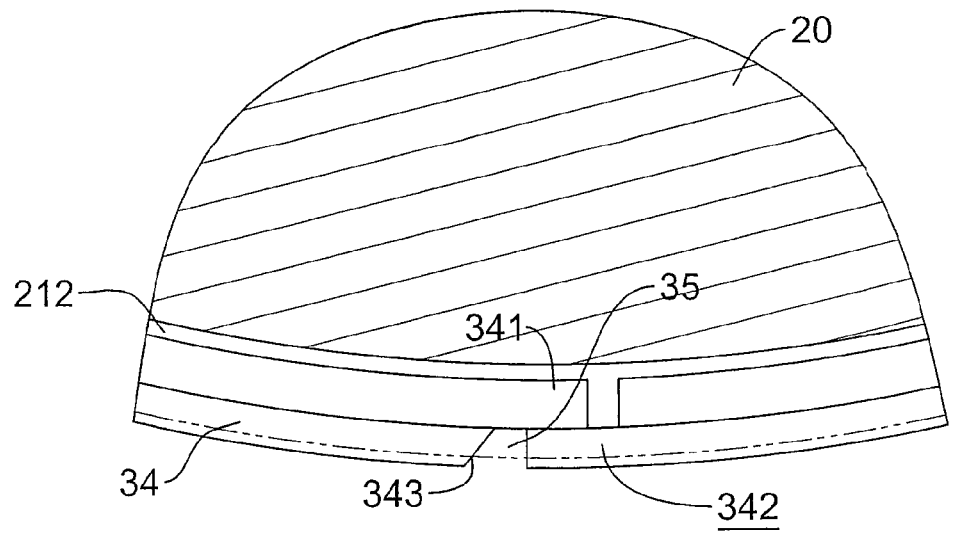
FIG. 7 is an enlarged cross-sectional top view of the durable piston in FIG. 1.

With further reference to FIG. 7, the first end of the proximal ring (34) may have an inner connecting extension (341) and an inclined portion (343).

The inner connecting extension (341) is formed on and protrudes from the first end of the proximal ring (34) adjacent to the inner edge of the proximal ring (34).

The inclined portion (343) is formed on the first end of the proximal ring (34) adjacent to the outer edge of the proximal ring (34), is inclined from the outer edge of the proximal ring (34) toward the inner connecting extension (341) and corresponds to the proximal positioning protrusion (29) to prevent the proximal ring (34) from rotating.

The second end of the proximal ring (34) may have an outer connecting extension (342). The outer connecting extension (342) is formed on and protrudes from the second end of the proximal ring (34) adjacent to the outer edge of the proximal ring (34), corresponds to the inner connecting extension (341) and selectively abuts the inner connecting extension (341) to hermetically seal the second airway.

The at least one piston ring (24) is mounted around the piston head (20) and abuts the inner wall of the cylinder (40) to further assist in preventing air leakage.

Figure 9:
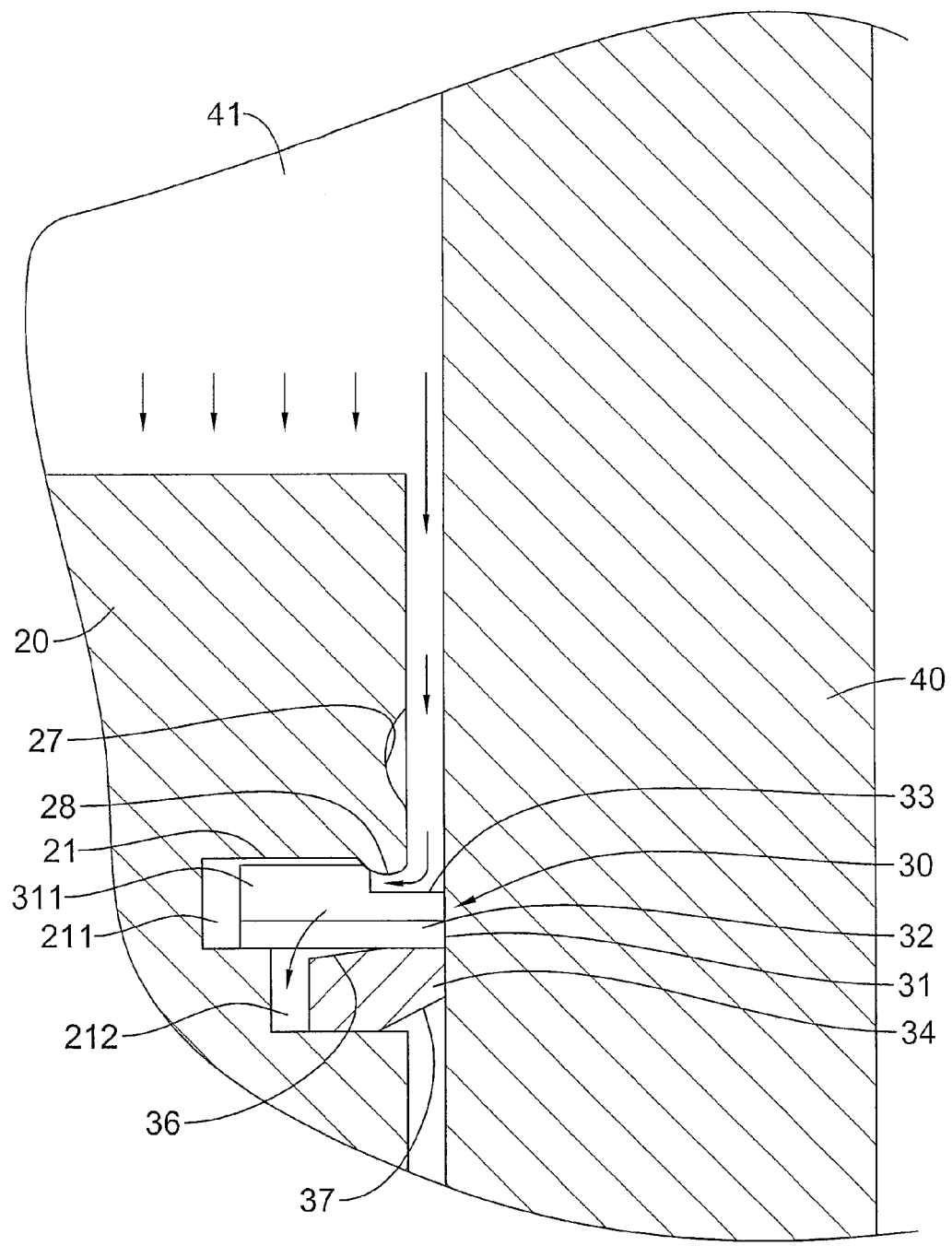
FIG. 9 is an enlarged operational side view of the durable piston in FIG. 1, showing the cylinder being operated.
Figure 10:
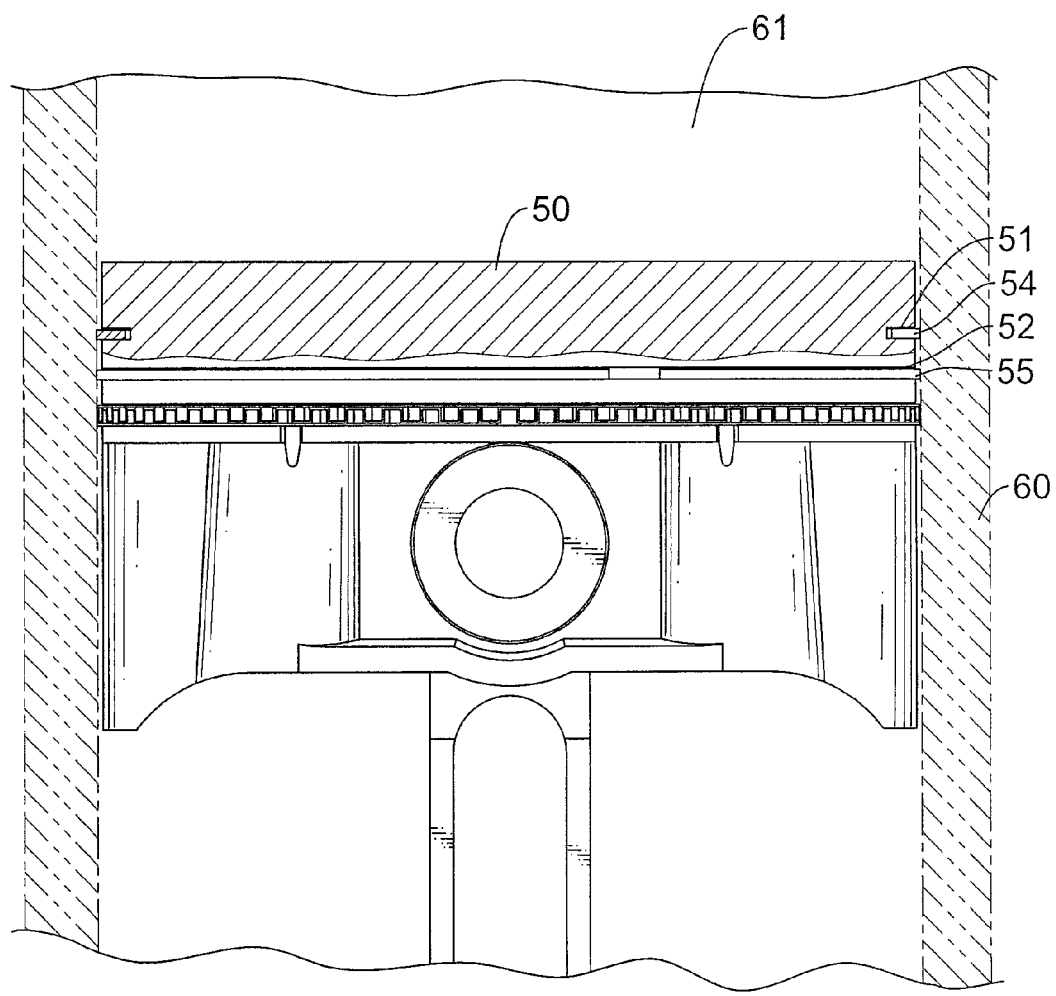
FIG. 10 is a side view in partial section of a conventional piston in accordance with the prior art being applied in a cylinder.

With further reference to FIG. 9, when the engine operates, fuel is ignited to generate high pressure air in the fuel chamber (41), then the high pressure air fills the first and second airways to press the rings (31, 34) tightly against the inner wall of the cylinder (40). Therefore, even when the rings (31, 34) or the inner wall of the cylinder (40) wear after long use, the design with the airways ensures the rings (31, 34) expand to provide good contact between the durable ring unit (30) and the cylinder (40) to prevent air leakage.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A durable piston comprising
   a piston head having
      an annular wall; and
      a ring unit mount being annular, being formed around the annular wall of the piston head and having
         a distal edge;
         a proximal edge;
         a distal ring groove being formed transversely in and around the ring unit mount adjacent to the distal edge and having an inner wall;
         a proximal ring groove being formed transversely in and around the ring unit mount adjacent to the proximal edge, being adjacent to and being shallower than the distal ring groove and having an inner wall;
         a distal positioning protrusion being formed on and protruding towards the distal ring groove from the distal edge of the ring unit mount; and
         a proximal positioning protrusion being formed on and protruding towards the proximal ring groove from the proximal edge of the ring unit mount; and
   a durable ring unit being mounted around the ring unit mount and having
      a distal ring being mounted around the distal ring groove and having
         a distal surface;
         a proximal surface;
         an outer edge;
         an inner edge being separated from the inner wall of the distal ring groove; and
         a gap being formed in the distal ring, forming two separated ends of the distal ring and corresponding to the distal positioning protrusion;
         a shoulder being annular and being formed on and protruding transversely from the outer edge of the distal ring adjacent to the proximal surface of the distal ring; and
      a proximal ring being mounted around the proximal ring groove and having
         an outer edge;
         an inner edge being separated from the inner wall of the proximal ring groove;
         a distal surface abutting the proximal surface of the distal ring and having an oblique portion being formed on the distal surface of the proximal ring adjacent to the inner edge of the proximal ring and being angled inward, toward the proximal edge of the ring unit mount from the outer edge toward the inner edge;

a proximal surface having an oblique portion being formed on the proximal surface adjacent to the outer edge of the proximal ring and being angled toward the distal surface of the proximal ring from the inner edge toward the outer edge; and a gap being formed in the proximal ring, is staggered with the gap of the distal ring, forming overlapping first and second ends of the proximal ring and corresponding to the proximal positioning protrusion.

2. The durable piston as claimed in claim 1, wherein one of the separated ends of the distal ring has an oblique portion having a longer proximal surface than distal surface and corresponding to the distal positioning protrusion.

3. The durable piston as claimed in claim 2, wherein the first end of the proximal ring has an inner connecting extension being formed on and protruding from the first end of the proximal ring adjacent to the inner edge of the proximal ring; and an inclined portion being formed on the first end of the proximal ring adjacent to the outer edge of the proximal ring, being inclined from the outer edge of the proximal ring toward the inner connecting extension and corresponding to the proximal positioning protrusion; and the second end of the proximal ring has an outer connecting extension being formed on and protruding along the second end of the proximal ring adjacent to the outer edge of the proximal ring, corresponding to the inner connecting extension and selectively abutting the inner connecting extension.

4. A durable ring unit comprising
a distal ring having
a proximal surface;
a distal surface;
an inner edge;
an outer edge;
a gap being formed in the distal ring and forming two separated ends of the distal ring; and
a shoulder being annular and being formed on and protruding transversely from the outer edge of the distal ring adjacent to the proximal surface of the distal ring; and a proximal ring having
an outer edge;
an inner edge;
a distal surface having an oblique portion being formed on the distal surface of the proximal ring adjacent to the inner edge of the proximal ring;
a proximal surface having an oblique portion being formed on the proximal surface of the proximal ring adjacent to the outer edge of the proximal ring; and
a gap being formed in the proximal ring and forming overlapping first and second ends of the proximal ring.

5. The durable ring unit as claimed in claim 4, wherein one of the separated ends of the distal ring has an oblique portion having a longer proximal surface than the distal surface.

6. The durable ring unit as claimed in claim 5, wherein the first end of the proximal ring has an inner connecting extension being formed on and protruding from the first end of the proximal ring adjacent to the inner edge of the proximal ring; and an inclined portion being formed on the first end of the proximal ring adjacent to the outer edge of the proximal ring and being inclined from the outer edge of the proximal ring toward the inner connecting extension; and the second end of the proximal ring has an outer connecting extension being formed on and protruding along the second end of the proximal ring adjacent to the outer edge of the proximal ring.

\* \* \* \* \*